United States Patent Office 3,284,472
Patented Nov. 8, 1966

3,284,472
PROCESS FOR THE PREPARATION OF 2,3,4-TRI-
CHLOROANTHRAQUINONE - 1 - CARBOXYLIC
ESTERS
Paul Kniel, Muttenz, Switzerland, assignor to Ciba
Limited, Basel, Switzerland, a Swiss company
No Drawing. Filed Jan. 28, 1963, Ser. No. 254,464
Claims priority, application Switzerland, Feb. 2, 1962,
1,310
7 Claims. (Cl. 260—376)

The present invention is based on the observation that 2,3,4-trichloroanthraquinone-1-carboxylic acid alkyl esters can be manufactured in a smooth manner by subjecting the Diels-Alder adduct from a 5,5-dialkoxy-1,2,3,4-tetrachlorocyclopentadiene and 1,4-naphthoquinone (Formula 1) in an organic solvent to the action of a halogen, for example chlorine or bromine. The reaction may be represented as follows:

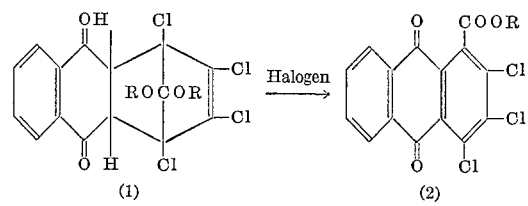

The compounds of Formula 1 to be used as starting materials may be obtained by heating equimolecular proportions of a 5,5-dialkoxy-, particularly dimethoxy-1,2,3, 4-tetrachlorocyclopentadiene, and 1:4-naphthoquinone (cf. my U.S. Patent application No. 174,677, filed February 21, 1962, now abandoned).

The present process is particularly useful when applied to products of Formula 1 wherein R is a lower alkyl group with at the most 5 carbon atoms.

Organic solvents suitable for use in the present process are, for example, halogenated aliphatic hydrocarbons such as chloroform, carbon tetrachloride or tetrachloroethane, or aliphatic carboxylic acids, such as acetic acid or a chlorinated acetic acid.

The choice of the organic solvent is not critical except for such solvents as react chemically with halogen at a rate to interfere with the desired reaction.

The halogenation is advantageously carried out at an elevated temperature, that is to say at a temperature between 50° C. and the boiling point of the solvent used.

The reaction mechanism is not fully understood and it is rather surprising that such a thorough rearrangement of the molecule occurs on simple treatment with halogen.

It is probable that halogen is first added on to the isolated double bond of the Diels-Alder adduct, whereupon the ring is opened, hydrogen halide and alkyl halide are eliminated, and the molecule undergoes aromatization accompanied by rearrangement of the ketal group to the carbalkoxy group.

The 2,3,4-trichloroanthraquinone-1-carboxylic acid esters are obtained in good yield and purity and can be isolated from the reaction mixture by filtration. Hydrolysis of these esters under mild conditions yields the free 2,3,4-trichloroanthraquinone-1-carboxylic acid. Both the acid and the esters are valuable, new intermediates suitable for a wide variety of uses, inter alia for the manufacture of vat dyestuffs, dispersion dyestuffs or pigments.

Unless otherwise indicated, parts and percentages in the following examples are by weight:

*Example 1*

50 parts of the adduct from 5,5-dimethoxy-1,2,3,4-tetrachlorocyclopentadiene and 1:4-naphthoquinone were dissolved by heating in 600 parts by volume of chloroform. The solution was allowed to cool to room temperature and 78 parts of bromine were added. In the course of one hour the mixture was heated to the boil and then refluxed for 5 hours, allowed to cool with stirring for 12 hours and evaporated to dryness. The residue was taken up in 320 parts by volume of glacial acetic acid, dissolved by heating, and boiled for one hour after adding a small amount of active carbon. There was a strong evolution of hydrogen halide. After filtering the hot solution to remove the active carbon the filtrate was allowed to cool to room temperature, filtered, the filter cake washed with glacial acetic acid and water and dried. The yield was 37 parts (=84.6% of theory) of pure 2,3,4-trichloroanthraquinone-1-carboxylic acid methyl ester melting at 194 to 195° C.

Analysis.—$C_{16}H_7O_4Cl_3$—Calculated percent: C, 52,00; H, 1.91; Cl, 28.78; $CH_3$ groups, 4.07. Found percent: C, 51.90; H, 2.04; Cl, 28.76; $CH_3$ groups, 4.06.

Hydrolysis with alcoholic sodium hydroxide solution at room temperature gave 2,3,4-trichloroanthraquinone-1-carboxylic acid in the form of yellow prisms which on recrystallization from glacial acetic acid melted at 272 to 273.5° C. (uncorrected).

Analysis.—$C_{15}H_5O_4Cl_3$—Calculated percent: C, 50.67; H, 1.42; Cl, 29.92. Found percent: C, 50.70; H, 1.51; Cl, 29.93.

Alkali titre (referred to molecular weight 355.5) =99.8%.

On treatment with thionyl chloride, 2,3,4-trichloroanthraquinone-1-carboxylic acid readily formed the acid chloride which can be converted with ammonia into the 2,3,4-trichloroanthraquinone-1-carboxylic acid amide which crystallized from glacial acetic acid in pale-yellow needles melting at 282 to 282.5° C. (uncorrected).

*Conversion of 2,3,4-trichloroanthraquinone-1-carboxylic acid ester into a dispersion dyestuff.*—A mixture of 10 parts of 2,3,4-trichloroanthraquinone-1-carboxylic acid methyl ester and 200 parts by volume of an aqueous 24% ammonia solution was heated in an autoclave for 5 hours at 180–185° C. and then allowed to cool. Ice was added and batch was acidified with aqueous 15% hydrochloric acid. It was then filtered, the filter residue washed with water until neutral and then dried. An aqueous dispersion of the resulting dyestuff dyed cellulose acetate bluish red tints and nylon claret tints.

*Example 2*

10 parts of the adduct from 5,5-dimethoxy-1,2,3,4- tetrachlorocyclopentadiene and 1,4-naphthoquinone were dispersed in 120 parts by volume of glacial acetic acid. A weak current of chlorine was then introduced into the suspension and the whole refluxed until no more hydrogen chloride evolved. The batch was then allowed to cool to room temperature, whereupon the reaction product crystallized out. It was filtered off, washed with glacial acetic acid and with water and dried, to yield 6.8 parts (=78% of theory) of crude 2,3,4-trichloroanthaquinone-1-carboxylic acid methyl ester melting at 175 to 183° C. On recrystallization from glacial acetic acid the pure product was obtained which melted at 195° C.

*Example 3*

By using in the process described in Example 1 56.6 parts of the adduct from 5,5-di-n-propoxy-1,2,3,4-tetrachlorocyclopentadiene and 1,4-naphthoquinone as starting material, 2,3,4-trichloroanthraquinone-1-carboxylic acid n-propyl ester melting at 132–133° C. was obtained in a yield corresponding to 74.7% of the theoretical. For analysis, the product was recrystallized from glacial acetic acid and obtained in light-yellow needles melting at 133–133.5° C.

*Chlorine content.*—Calculated: 268.%. Found: 26.6%.

On hydrolysis, the propyl ester like the methyl ester yielded 2,3,4-trichloroanthaquinone-1-carboxylic acid (melting at 272–273.5° C.).

What is claimed is:

1. A process for preparing 2,3,4-trichloroanthraquinone-1-carboxylic acid alkyl esters which comprises reacting a compound of the general formula

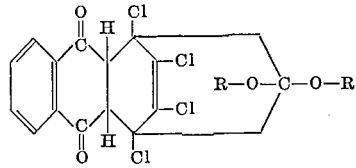

wherein R represents an alkyl radical of at the most 5 carbon-atoms in an organic solvent inert toward halogenation with a member selected from the group consisting of chlorine and bromine, under conditions to produce hydrogen halide and recovering the corresponding alkyl ester of 2,3,4-trichloroanthraquinone-1-carboxylic acid wherein the reaction is carried out at a temperature of from about 50° C. to the boiling point of the solvent employed.

2. A process as claimed in claim 1, wherein said member is liquid bromine.

3. A process as claimed in claim 1, wherein said member is gaseous chlorine.

4. A process as claimed in claim 2, wherein at least 60 parts of bromine are used for every 50 parts of the said compound.

5. A process as claimed in claim 1, wherein the solvent is a halogenated aliphatic hydrocarbon containing at the most 3 carbon atoms.

6. A process as claimed in claim 5, wherein the solvent is chloroform.

7. A process as claimed in claim 1, wherein the solvent is a member of the group consisting of acetic acid and halogenacetic acids.

References Cited by the Examiner

UNITED STATES PATENTS 1,966,126   7/1934   Kranzlein et al. _____ 260—376

FOREIGN PATENTS 495,335   4/1930   Germany.
564,435   11/1932   Germany.
16,151    1910     Great Britain.
439,509   12/1935  Great Britain.

OTHER REFERENCES

Allen, "Chem. Rev," vol. 62, pp. 653–664 (1962).
Eaton et al.: "J. Org. Chem." vol. 25, pp. 1225–1227 (1960).
Hoch, "J. Org. Chem.," vol. 26, pp. 2066–2072 (1961).

LORRAINE A. WEINBERGER, *Primary Examiner.*

LEON ZITVER, *Examiner.*

R. K. JACKSON, H. C. WEGNER, *Assistant Examiners.*